United States Patent [19]
Watt

[11] 3,782,171
[45] Jan. 1, 1974

[54] PRECISION HOLE VERIFICATION SYSTEM

[76] Inventor: Gordon James Watt, 245 Unquowa Rd., Apt. 106, Fairfield, Conn. 06430

[22] Filed: Aug. 19, 1971

[21] Appl. No.: 172,984

[52] U.S. Cl. .............................. 73/37.9, 33/DIG. 2
[51] Int. Cl. .......................................... G01b 13/10
[58] Field of Search.................... 73/37.9; 33/DIG. 2

[56] References Cited
FOREIGN PATENTS OR APPLICATIONS
124,896    7/1947    Australia.......................... 33/DIG. 2

Primary Examiner—Richard C. Queisser
Assistant Examiner—Joseph W. Roskos
Attorney—Herbert L. Boettcher et al.

[57] ABSTRACT

A Flexible Membrane Bearing is used as a gage to sense variations in the surface shape of a hole which acts as the bearing bore, the deformation characteristics of the thin cylindrical tube which constitutes the bearing surface being used to amplify the effects of clearance and out of roundness as sensed by the outlet restrictor edge of the bearing. Secondary sensing means are employed to measure membrane deflections with respect to the bearing shaft at selected points behind the bearing surface using bridge type detection means to correlate said deflections with the different modes of deformation which are characteristic of a thin tube supported at the ends. Secondary measurements are in turn correlated with angular position of the bearing and its axial position in the hole. The system comprises the bearing, power and control, sensors, and means for data handling including display, recording, and processing.

7 Claims, 12 Drawing Figures

PATENTED JAN 1 1974

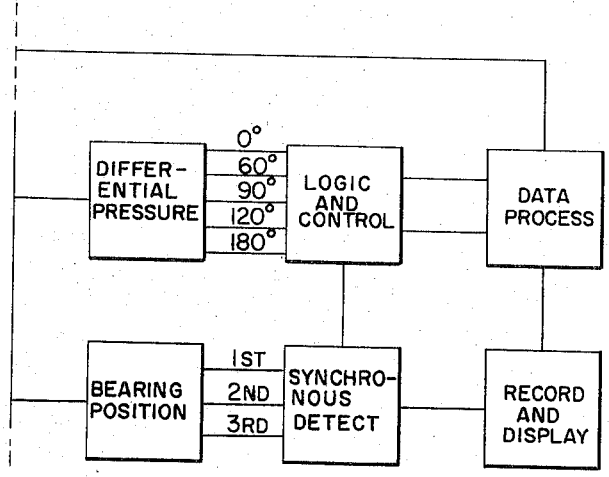
FIG. 5
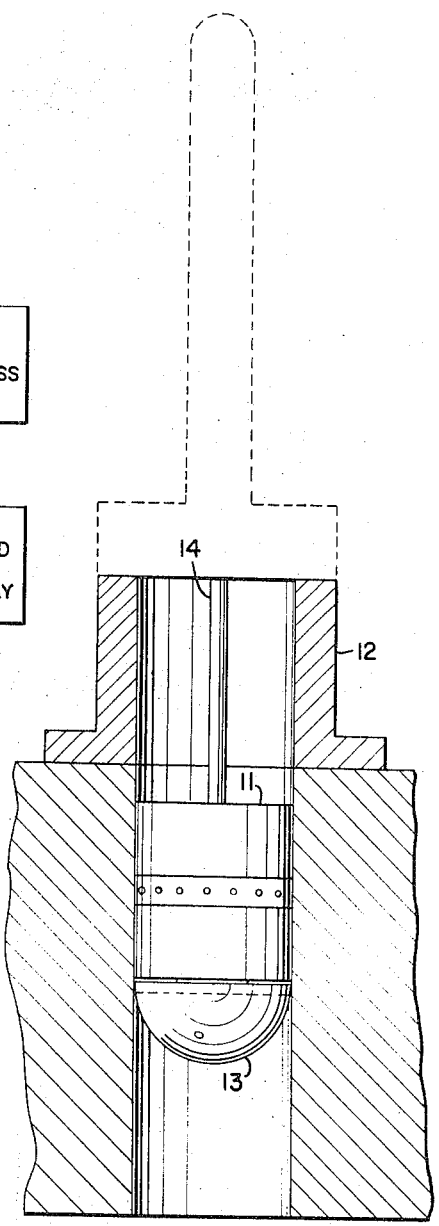
FIG. 6
| MOD. POS. | 3 | 2 | 1 | 0 |
|---|---|---|---|---|
| 0° | O | O | O | O |
| 60° | ✓ | – | – | O |
| 90° | – | ✓ | – | O |
| 120° | O | – | – | O |
| 180° | ✓ | O | ✓ | O |
FIG. 4

PRECISION HOLE VERIFICATION SYSTEM

BACKGROUND OF THE INVENTION

This invention is related to those described in my copending application Ser. No. 159,608, filed July 6, 1971 for Flexible Membrane Bearing and in my copending application Ser. No. 172,985 filed Aug. 19, 1971 for Portable Precision Hole Finishing Device.

The membrane surface for a journal bearing is a thin cylindrical shell supported by the shaft which has raised lands at the ends and around the center. Each bearing section between lands resembles a thin tube slipped over a spool for thread. The shaft assembly fits inside a smooth bore in the bearing housing so that when the bore and shaft are coaxial there is an even clearance between the membrane surface and the surface of the bore. Fluid is forced to flow axially outward from the mid section through the clearance area being led through channels in the shaft or housing to a manifold formed in the membrane surface or the bore in an annular groove around the mid section. These and other details of design and operation are covered thoroughly in the referenced applications.

When fluid is applied under pressure to the manifold of a Flexible Membrane Bearing while no external force is put upon the shaft, the membrane surface is deformed radially inward in a symmetric manner around the shaft in proportion to the pressure between the bearing surfaces. Pressure drops off in proportion to a fractional power of the axial distance from the edge of the manifold in the case of a centered bearing, to a terminal value near the outlet edge which depends primarily on the outlet clearance. The fractional exponent on distance varies from the one-fifth power for low outlet clearance to the one-half power for large clearance. Membrane deflections as measured between the back of the membrane and the shaft are a sensitive indicator of outlet clearance.

Variation of clearance around the outlet edge of a Flexible Membrane Bearing causes the tube to bend in various modes of inextensional deformation. These bending modes might be described as variations of the membrane surface from that of a surface of revolution. Thus the tube might be bent as a beam, or squeezed into an oval cross section, or squeezed into a triangular or square cross section between supports. These are natural modes of bending which occur when too high a uniform pressure is applied to the external surface of a pressure vessel of cylindrical shape supported at the ends. It indicates an exceptional compliance to pressure patterns which conform to the same geometrical shape. These same geometric patterns are representative of the kind of irregularities which define the errors in the shape of a cylindrical hole.

The outlet edge of the bearing surface is rigidly supported by the land of the shaft. This support diminishes exponentially in the axial direction with an approximate characteristic distance equal to the membrane thickness. In this region the outlet surface remains in its original form regardless of membrane deformations in the bearing area. The outlet surface is made as round, firm, and stable as physically possible since it is the sensing surface used to control pressures over the bearing area. With no side thrust or radial torque on the shaft, the outlet surface at either end causes the shaft to be centered as a result of bearing action along an axis defined by the bore surface which matches the outlet surface.

Clearance around the space between the outlet surface and the surface of the bore will not be constant if the shaft is displaced radially or if the bore is not round. If the bore is out of round it will have a mean geometric center defined by the closest fitting circle. Bearing action will cause the center of the circle of the outlet surface to fall on the mean center of the bore when no side force is applied to the shaft.

Those skilled in the art of metrology will see how the Flexible Membrane Bearing may be used for measuring precision holes and the advantage it gives over other measuring means. The Talyrond or Indiron machines employ auxiliary spindles, slides, probes which contact the work, and employ manual or computer means for data reduction without giving an indication of absolute diameter. Ring gages or plug gages contact the hole on high points to indicate hole diameter but give very little information about hole shape. Non-contacting gages such as capacity, eddy current, or air devices must be scanned in the manner of Talyrond and they lose calibration because of surface condition, vibration, and thermal effects. Inside micrometers measure a single diameter but do not tell if the hole is round or straight.

A thorough understanding of this invention requires some knowledge of the elastic behavior of thin membrane shells as taught by Love and Gol'denvizer in their classic works. One must also have some background in the theory of operation of outlet restrictor hydrostatic bearings. These principles have been covered in some detail by the referenced disclosure for Flexible Membrane Bearing. Helpful also is background in filter theory, the principles of measurement, and data processing by computer correlation of measurements. Those who will find use for and be helped by my invention will also have sufficient background knowledge in the prerequisite sciences to understand the disclosure which follows.

SUMMARY OF THE INVENTION

A Flexible Membrane Bearing of the form described in the referenced disclosure for Portable Precision Hole Finisher is used as a sensing element to determine the shape and size of a smooth cylindrical hole which serves as the bearing bore. The bearing element rides as a journal in the bore, supported by gas lubrication which is distributed to the bearing inlet by a manifold on the membrane surface around the mid section of the bearing. Said manifold is a shallow annular groove which is fed from channels and holes in the shaft which carries the membrane tube on raised lands at the ends and the mid section. There are actually two bearing sections fed from the common manifold and controlled by the outlet surface at either end. With pressure supplied through the shaft and no side forces applied, the axis of the shaft as defined by the centers of the two outlet surfaces will coincide with the axis of the bore as defined by the mean centers of the bore surfaces opposite said outlet surfaces of the journal.

If the bore is perfectly round and straight, the membrane surfaces will not deform with respect to the shaft as the shaft is turned in the bore or moved axially along the bore. Furthermore the journal does not touch the bore because it is supported on an air film by bearing action. If the bore is not perfect, the membrane surface will respond to rotation and translation. The degree of response depends upon the compliance which is designed into the thin membrane tube. Compliance here must be defined in terms of the various modes of deformation which are natural to a thin cylindrical shell supported at the ens.

To better understand the invention one must understand the various modes of deformation and how they relate to the standard imperfections in a cylindrical bore. Measurements are made to determine taper, barrel, bell mouth, banana, ovality, triangularity, squareness, size, and direction of holes. These descriptive deformities can also be described mathematically as linear and harmonic variations of the radii as functions of axial position and angular position around the axis. The same mathematical descriptions are used to define the natural deformation modes for the thin membrane tubes which form the bearing surfaces. The invention may be better understood by a few examples.

Suppose the hole is tapered but perfectly round and straight. Say the membrane bearing journal is inserted into the wide end and moved toward the narrow end without rotation. The bearing will self center; clearance at the leading end will be less than at the trailing end; clearance at both ends will decrease with motion along the axis. If the bearing is rotated at any position no clearance changes will occur at either end. Each bearing surface will be compressed extensionally without bending as the outlet clearance decreases. Pressure gradients will be axial on each surface and the pressure profiles will vary with a different fractional power of axial distance from the manifold because the end clearances are different. Since pressure changes on the bearing surfaces result in radial deformation of the membrane with respect to the shaft in the area between the lands, the clearance between the back of the membrane and the shaft can be used as a measure of said pressure changes.

For the example given the most sensitive measurement which can be made is the differential change in volume between the two back regions at either side of the mid section. Other hole deformities such as ovality or lack of straightness produce inextensional deformation modes which bend the membrane tubes without volume change. This bending will be modulated with respect to the angular position of the shaft as the shaft is turned in the hole. Lack of straightness will be a first harmonic of the rotation; ovality will be a second harmonic; triangularity a third harmonic; and so on. These may best be measured as dynamic pressure changes in a liquid which fills the space between the membrane and the shaft.

It is an object of the invention to utilize the natural filtering which the Flexible Membrane Bearing provides in the frequency and space domains. One way is to fill the cavities between the membrane bearing areas and the shaft with fluid of a selected viscosity and measure differential pressure and volume changes between selected points behind the membrane surfaces as the bearing is turned at constant speed. Sampling is done through small holes drilled radially through the shaft and used in the manner of pitot tubes to transmit pressure changes to transducers carried on the shaft. Output of said transducers is in a form useful for recording and processing of the data. This will be explained in more detail in the description of the preferred embodiment with reference to the drawings.

Space filtering is accomplished by selectively spacing the sampling holes around and along the shaft behind the membrane. For instance the differential pressure between two holes at the same axial position but diametrically opposite one another will vary with odd harmonics of membrane displacement but not respond to even harmonics. If the dynamic differential pressure changes as measured are correlated with rotation by such means as synchronous detection, frequency filtering is accomplished. Thus it is an object of the invention to separate and measure the amount of each type of hole deformity by a combination of space filtering and frequency correlation.

It is a further object to define a useful instrument which is an improvement over other known precision hole measuring instruments because it uses the natural characteristics of Flexible Membrane Bearing in an effective combination with other compatible components and techniques. Said instrument is a system comprising the components, power supplies, controls, displays, and logic of data handling.

A description of the preferred embodiment suggests the use of other outlet restrictor bearings and other transducers combined into a similar system for precision measurement of cylindrical holes. It is not intended to limit the concept of the invention by illustrating a preferred combination of an outlet restrictor bearing, means for sensing pressure distribution in the bearing area relative to the journal, means for correlating measured pressure in space and time, and logic means for control and data handling. The preferred embodiment is described in detail with reference to the drawings. Alternatives which are considered to fall within the scope of the invention are disclosed in the claims.

BRIEF DESCRIPTION OF THE DRAWINGS

FIG. 4 is a type of truth table indicating the location of differential pressures which correspond to deformation modes.

FIG. 5 is a block diagram showing the interrelationship of the system components in the Precision Hole Verification System.

FIG. 6 shows the measuring head in place as in use with a guide element which may be used to determine straightness and absolute diameter of a bore. This drawing also shows the basic elements of the Portable Precision Hole Finisher dotted in to illustrate how the Precision Hole Verification System may be used for in-process measurement and control.

DETAILED DESCRIPTION OF THE DRAWINGS

Figure 1:
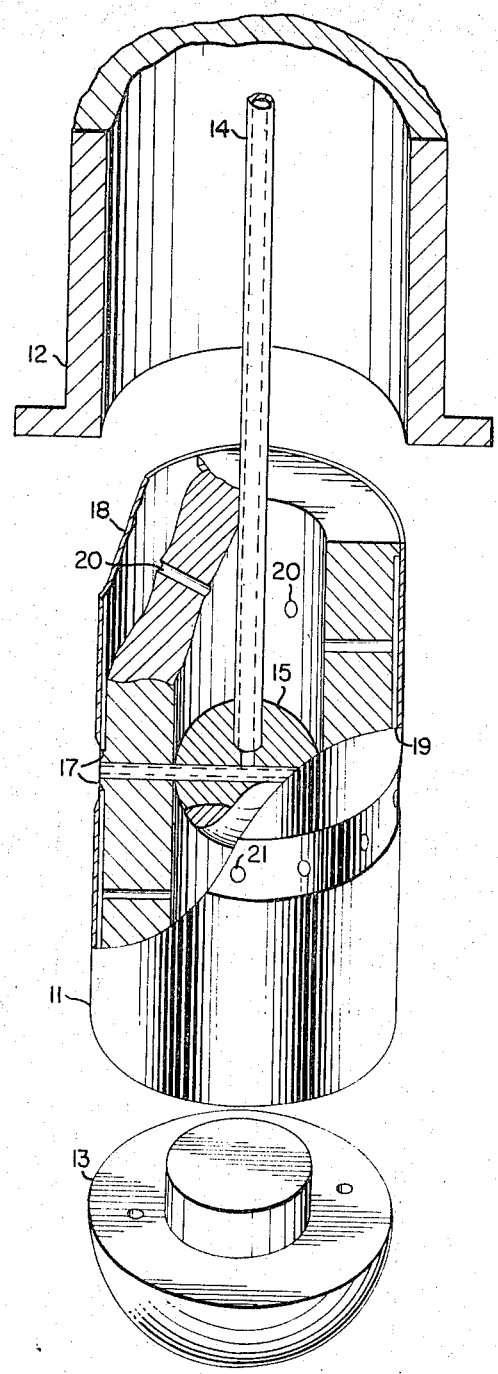
FIG. 1 is a perspective view of the outlet restrictor bearing cut away in some places to show the location of holes and sensors for the preferred embodiment.
Figure 2A:
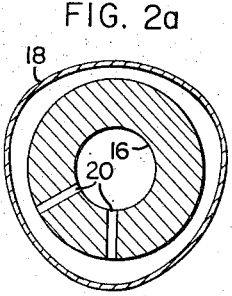
FIGS. 2a, 2b, 2c, and 2d illustrate the important modes of bending of the membrane which correspond to irregularities of interest in the roundness of the hole.
Figure 2B:
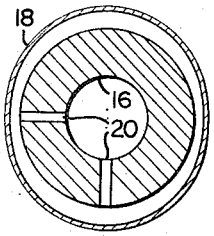
Figure 2C:
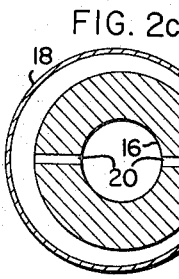
Figure 2D:
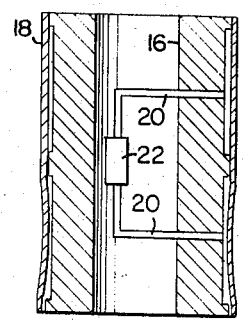
Figure 3A:
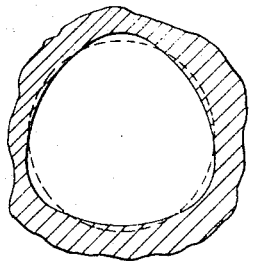
FIGS. 3a, 3b, 3c, and 3d show typical irregularities of hole form along the axis of the bore.
Figure 3B:
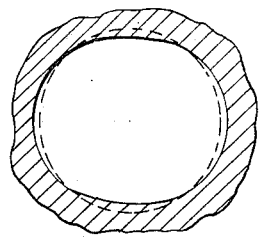
Figure 3C:
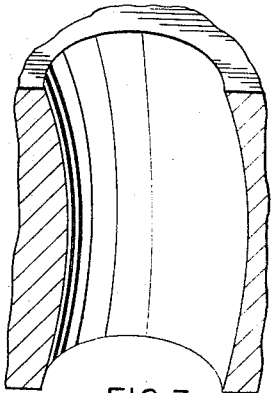
Figure 3D:
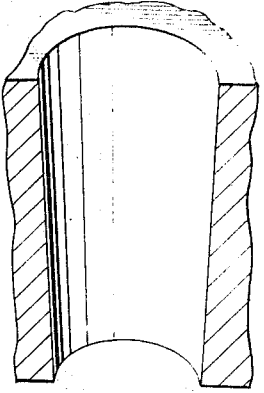

Referring now to the drawings, in FIG. 1 is shown a sectional perspective of the important mechanical elements of the Precision Hole Verification System. The Flexible Membrane Bearing 11 is sized to fit the hole to be measured with sufficient clearance to operate as a hydrostatic bearing over the range of tolerances anticipated. The guide bushing 12 is precisely shaped and sized to serve as a standard reference for absolute diameter when this is a desired measurement. It is also used to guide the bearing into the hole without contact and may be used to protect the bearing against dirt and damage when it is not being used for measurements. The nose guide 13 may be used to lead the bearing into a hole whether or not the guide bushing is being used. Diameter of the nose guide is slightly greater than the outlet surface of the bearing.

For the case of an in-process measurement system, the nose guide 13 may be replaced by a cutting head as in the Portable Precision Hole Finisher. This may b a grinding, boring, or lapping head, or may be a head used for electro-chemical milling or electric discharge machining. The bearing serves as a precise guide for the head while material is being removed. The bearing may be monitored during the removal operation or sequentially with the removal operation to provide measurement data in the hole being formed.

The bearing is turned and moved axially by a hollow shaft 14 which is thin enough to be flexible and not transmit moments and vibrations which would disturb the measurement. Fluid is fed from an external supply through this shaft into a ball coupling 15 which has been channeled to distribute the fluid to the body 16 of the bearing. The ball 15 and body 16 are coupled by a hollow tube which admits the fluid to a groove between the central lands 17. Said lands along with a land at either end of the bearing body support a hollow shell which surrounds the body of the bearing. This shell is the flexible membrane 18 which forms the bearing surfaces on the journal. Since the lands are raised rings around the body, there is a cavity 19 between the body and the membrane. Radial holes 20 penetrate the body at selected positions to give access to the cavity. Other radial holes 21 penetrate the membrane 18 to give access to the annular groove between the central lands. The membrane surface is relieved in a wide band around the center to provide an even distribution of fluid from the holes 21 all around the bearing when it is in place in the hole to be measured.

When fluid is applied under pressure and the bearing is in place in the hole, the membrane deflects into the cavity 19 and the bearing operates as an outlet restrictor hydrostatic bearing. Fluid flows axially in the narrow clearance between the membrane and the hole, starting at line pressure around the central band and dropping to ambient pressure at the ends. The membrane deformation depends on the pressure distribution between the mid section and the end, and vice versa the pressure distribution depends on the membrane deformation and the clearance at the end. This involved relationship has been explained in the previously mentioned co-pending application Ser. No. 159,608 for Flexible Membrane Bearing.

FIG. 2 shows shows several types of membrane deflections relative to the supporting body of the bearing. Immediately adjacent in FIG. 3 is a diagram of the type of hole deformity which produces the mode of deformation depicted in FIG. 2. Reading from top to bottom in these two figures one can see triangularity, ovality, banana, and taper. Only in the case of taper is the volume of the cavity 19 changed as the bearing is slid axially along the hole. Special cases of taper include barrel and bellmouth. In the other cases where volume of the cavity does not change, position of the irregular clearance between the membrane and body of the bearing does change as the bearing is turned in the hole.

Change in the volume or shape of the cavity between the membrane and body is detected by pressure taps 20 which are radial holes through the body geometrically located as shown in FIG. 2. The pressure to be measured is that of a liquid with significant viscosity which fills the cavity and is allowed to overflow through the holes 20. If the pairs of holes as shown in FIG. 2 are interconnected by pressure transducers 22, differential pressures are indicated according to the type of hole deformity as the bearing is moved in the hole.

The mechanism of pressure change is the interaction between volume change and fluid resistance. As the fluid is forced to flow from high clearance areas which are being reduced to low clearance areas which are being increased, lateral pressure gradients are developed. These gradients only exist in the cavity 19 while the bearing is being moved in a deformed hole. Pumping of the fluid around the cavity is an eccentric diaphragm action in all cases except the taper where no fluid motion occurs around the cavity as the bearing is turned. In this latter case fluid is pumped in and out of the cavities as the bearing is slid axially in the hole.

The table shown in FIG. 4 is a type of truth table which relates pressure tap 20 position around the body of the bearing as it relates to the different modes of membrane deformation. Spacing of pairs of holes around the bearing are indicated in degrees. Thus the cases shown in FIG. 2, from top to bottom are 60°, 90°, 180°, and 360° or 0° which are equivalent. Similarly the modes of bending from top to bottom are of orders 3, 2, 1, and 0. These same orders identify the types of hole deformities shown in FIG. 3. In the truth table a check mark indicates the greatest indication of differential pressure produced by bearing rotation. A zero indicates no differential pressure, while a dash indicates some intermediate value between zero and maximum.

Logic presented by the table in FIG. 4 is a useful part of the measurement system. For instance, no indication on the 180° differential transducer with readings on all others indicates the second mode or ovality. A full indication appears on the 90° differential transducer which may be selected for synchronous detection with the second harmonic of shaft rotation. The logic may be extended to identify various combinations of modes and sort them out for measurement in the manner indicated by the system block diagram in FIG. 5. The means indicated within each block are considered to be state of art. The system of standard instruments in combination with the flexible membrane bearing compose the Precision Hole Verification System.

Differential pressures as picked up by the transducers 22 between selected pairs of holes 20 are converted to measurable signals which may be processed by electronic or fluid logic. Bearing rotation is measured by synchro or generator to give reference signals which may be correlated with pressure measurements to provide synchronous detection. Output of the synchronous detector is observed and recorded as an indication of amplitude and phase of the hole deformities which have caused deformation of the membrane surface. Data processing may be provided for further refinement and possible dynamic or sequential control as indicated by the feedback line shown going back to the dashed section in FIG. 5.

Said dashed section refers to the drive and feed mechanisms which may turn and translate the shaft 14 in the manner disclosed for Portable Precision Hole Finishing Device in the previously mentioned copending application Ser. No. 172,985. An illustration of the mechanical apparatus needed for in-process measurement and control is shown in FIG. 6. Elements of the finishing system are shown by dashed lines to correspond to the dashed section of the block diagram in FIG. 5.

I claim as my invention:

1. A hole gauging head for sensing imperfections in the shapeof an elongated cylindrical bore of a workpiece while riding in the bore as a hydrostatic outlet restrictor bearing journal, comprising:
   a. a hollow cylindrical rotor having first and second pairs of axially spaced raised annular lands of equal diameter coaxially disposed on its outer periphery, the first pair being relatively widely spaced and located at the respective ends of said rotor, the second pair being relatively closely spaced and located midway between the rotor ends;
   b. A flexible cylindrical membrane coaxially surrounding said rotor and being supported at its ends and midway between its ends by said first and second pairs of lands, respectively, whereby spaces are left between the unsupported areas of the membrane and the underlying rotorq said membrane having a shallow annular relief in its outer periphery midway between its ends;
   c. a rotatable and axially translatable flexible drive shaft;
   d. a coupling within the hollow interior of said rotor serving to connect said rotor in driven relation to said drive shaft;
   e. interconnecting passageways in said drive shaft, coupling, rotor and membrane by means of which pressurized lubricating fluid can be fed into said annular relief from an external source of supply for distribution to the clearance between the membrane periphery and the bore undergoing sensing; and,
   f. signal generating means responsive to any spacing differential between at least one of said unsupported areas of the membrane and said underlying rotor at at least one pair of displaced points for providing a signal representing said spacing differential.

2. A hole gauging head according to claim 1, wherein:
   a. said spaces between the unsupported areas of the membrane and the underlying rotor are filled with a viscous fluid;
   b. pressure taps from said hollow interior of the rotor to said viscous fluid are provided at said pair of displaced points; and
   c. said signal generating means comprises a differential pressure transducer connected to said pressure taps.

3. A hole gauging head according to claim 1, wherein said pair of displaced points are diametrically opposed to one another.

4. A hole gauging head according to claim 1, wherein said pair of displaced points are angularly displaced from one another by 90° around the rotor axis.

5. A hole gauging head according to claim 1, wherein said pair of displaced points are angularly displaced from one another by 45° around the rotor axis.

6. A hole gauging head according to claim 1, wherein said pair of displaced points are displaced from one another in the direction of the rotor axis without having any angular displacement from one another around the rotor axis, each point being associated with a different one of said spaces between the membrane and rotor.

7. A hole gauging head according to claim 1, in combination with utilization means connected to said signal generating means, said utilizaing means being capable of correlating said signals with rotation of said rotor to provide synchronous detection of said spacing differential.

* * * * *